(No Model.) 5 Sheets—Sheet 1.

F. R. LOW & F. M. CLARK.
ROTARY STEAM ENGINE.

No. 386,479. Patented July 24, 1888.

WITNESSES. INVENTORS.

(No Model.) 5 Sheets—Sheet 2.

F. R. LOW & F. M. CLARK.
ROTARY STEAM ENGINE.

No. 386,479. Patented July 24, 1888.

Figure 2:
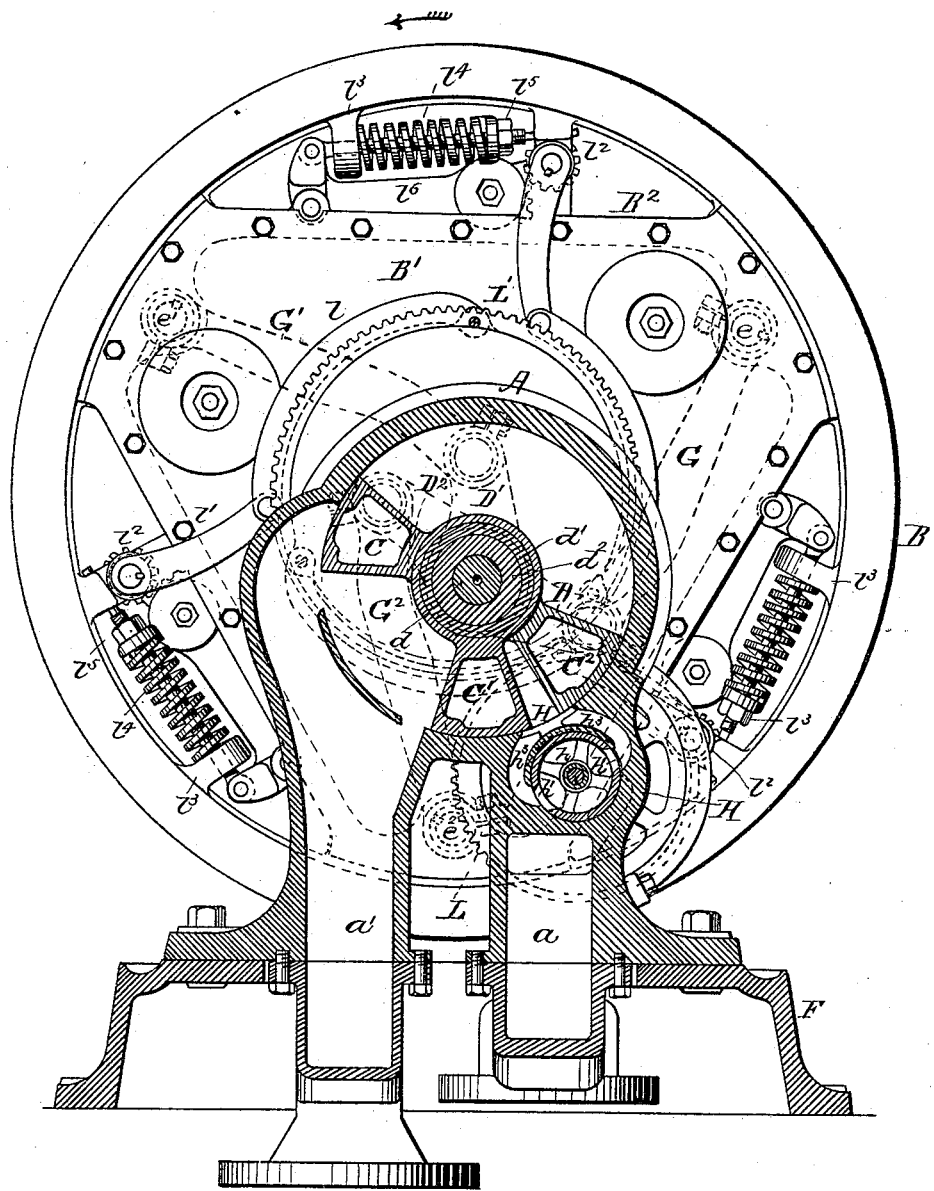

WITNESSES. Fig. 2. INVENTORS.

(No Model.) 5 Sheets—Sheet 3.

F. R. LOW & F. M. CLARK.
ROTARY STEAM ENGINE.

No. 386,479. Patented July 24, 1888.

WITNESSES. INVENTORS.

(No Model.)　　　　　　　　　　　　　　　　5 Sheets—Sheet 4.
F. R. LOW & F. M. CLARK.
ROTARY STEAM ENGINE.

No. 386,479.　　　　　　　　　Patented July 24, 1888.

WITNESSES.　　　　　　　　　　　　　　INVENTORS.

(No Model.) 5 Sheets—Sheet 5.
F. R. LOW & F. M. CLARK.
ROTARY STEAM ENGINE.

No. 386,479. Patented July 24, 1888.

UNITED STATES PATENT OFFICE.

FRED R. LOW, OF CHELSEA, MASSACHUSETTS, AND FRANK M. CLARK, OF TILTON, NEW HAMPSHIRE.

ROTARY STEAM-ENGINE.

SPECIFICATION forming part of Letters Patent No. 386,479, dated July 24, 1888.

Application filed July 1, 1887. Serial No. 243,058. (No model.)

*To all whom it may concern:*

Be it known that we, FRED R. LOW, of Chelsea, in the county of Suffolk and State of Massachusetts, and FRANK M. CLARK, of Tilton, in the county of Belknap and State of New Hampshire, both citizens of the United States, have invented a new and useful Improvement in Rotary Steam-Engines, of which the following is a full, clear, and exact description, reference being had to the accompanying drawings, forming a part of this specification, in explaining its nature.

This invention is a development of and improvement on the invention described in our application for Letters Patent of August 28, 1886, Serial No. 212,049.

The object of this invention is to provide means for coupling two revolving piston-engines of the character described in the former application upon one shaft to furnish proper cut-off valves and valve-gear for such engines, and to provide for oiling the same in a suitable manner.

Figure 1:
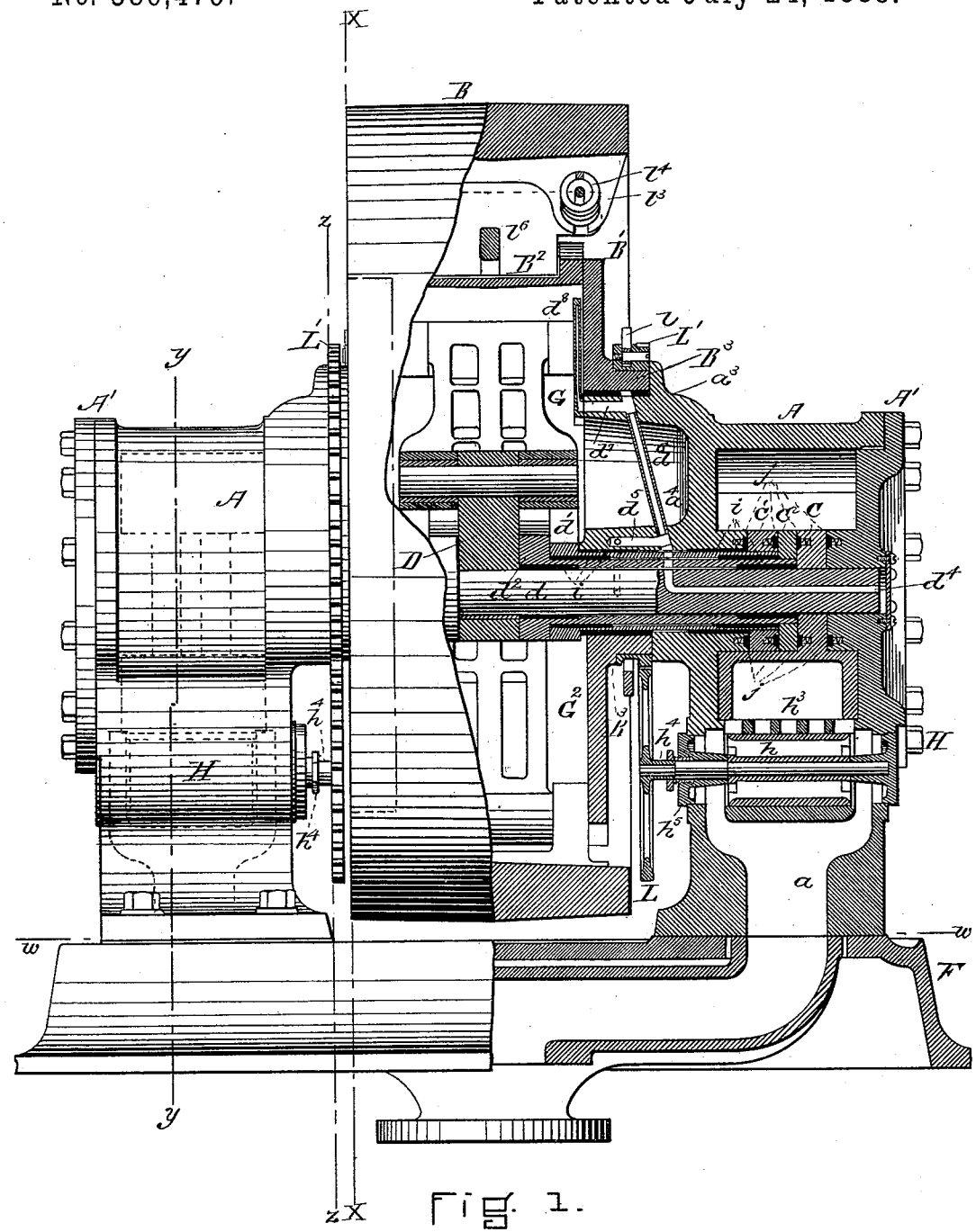
Figure 3:
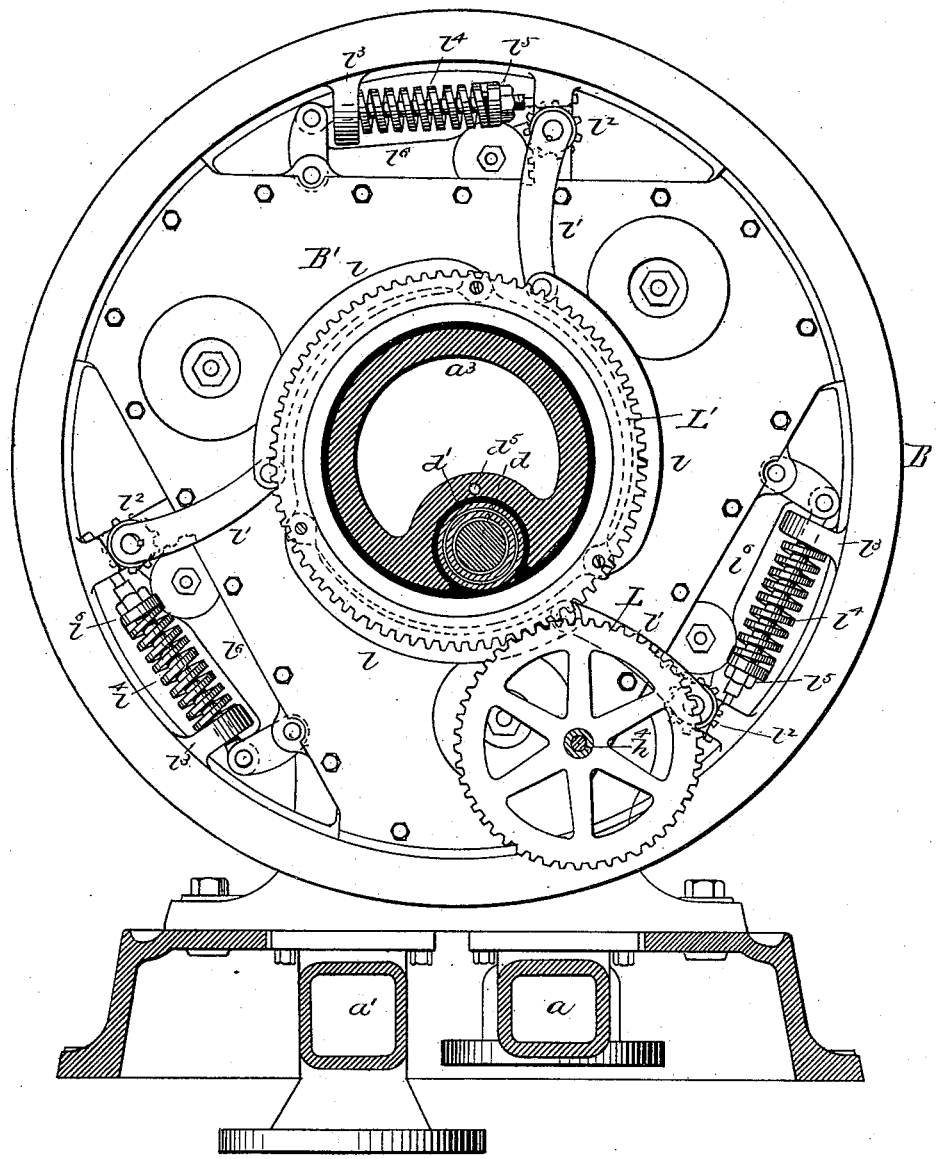
Figure 4:
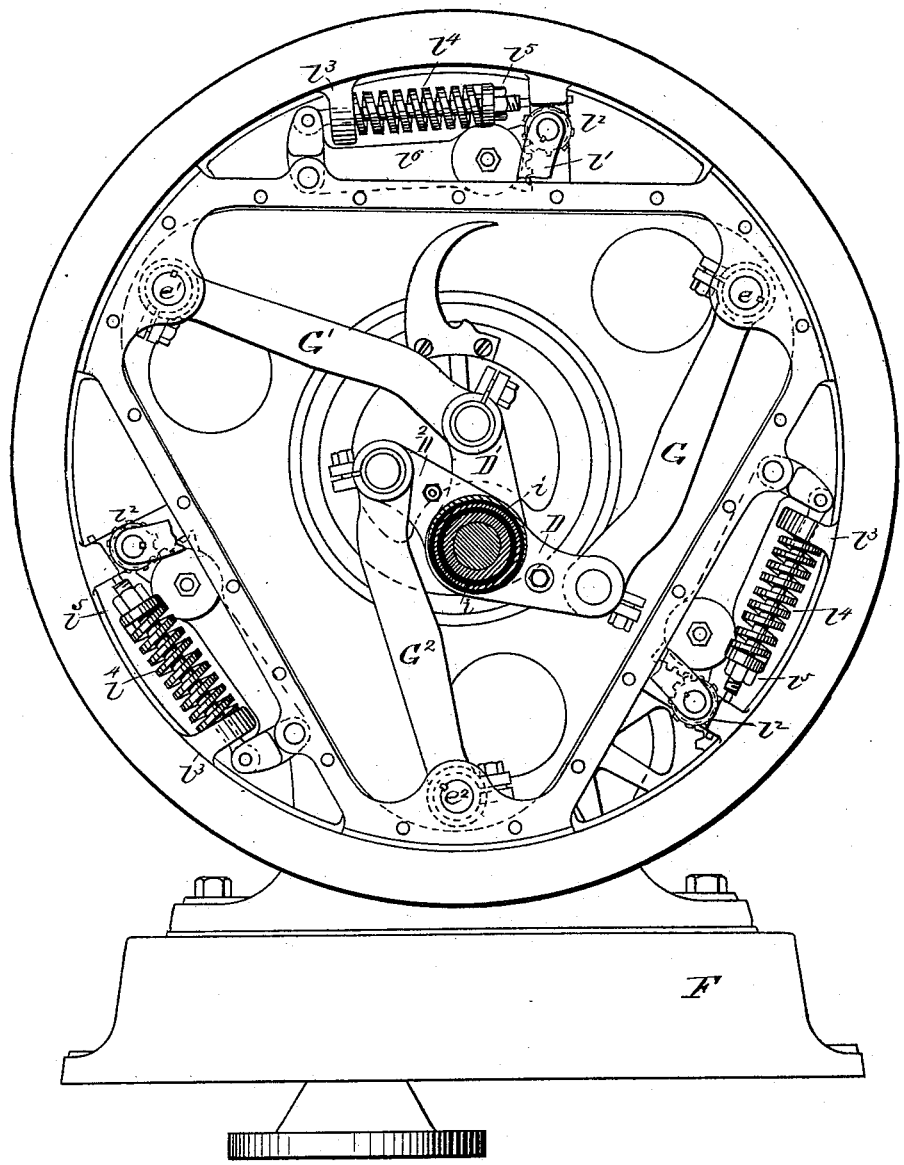
Figure 5:
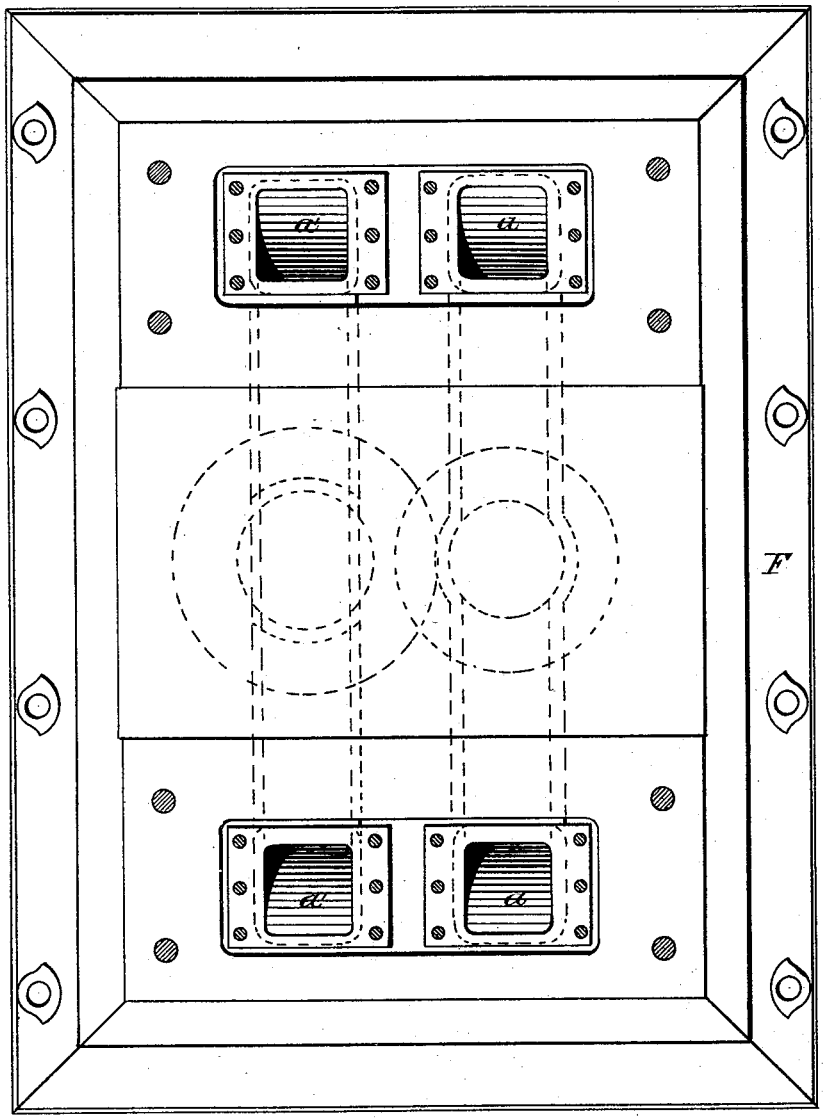

In the drawings, Figure 1 is a view, part in elevation and part in section, of a pair of engines of this description coupled to the same belt-pulley. Fig. 2 is a section on the line $y\ y$, looking toward the belt-pulley. Fig. 3 is a section on the line $z\ z$ of Fig. 1. Fig. 4 is a section on the line $x\ x$ of Fig. 1. Fig. 5 is a horizontal section on the line $w\ w$ of Fig. 1.

Like letters indicate like parts in all the figures.

A is the cylinder. It has a cover, A'. Induction-ports under the cylinder are shown at $a$. Exhaust-ports also communicate with the cylinder and are shown at $a'$.

H is the valve-chest. The cylinder contains three pistons, C C' C². These three pistons are mounted upon concentric shafts $d\ d'\ d^2$. These concentric shafts carry each a crank, D D' D², and from each of these cranks is extended a connecting-rod, G G' G², which lays hold of a wrist-pin, $e\ e'\ e^2$, in the rim of the fly-wheel B. The center of revolution of the fly-wheel B is at a distance from the center of revolution of the piston, somewhat less than the length of the crank-webs—in the drawings about one-tenth less—and the pistons revolve in their cylinder with continuous motion, alternately accelerated and retarded in such manner as to give a practically uniform motion to the revolution of the fly-wheel B. This fly-wheel B is placed midway between the two cylinders shown in Fig. 1, and its boss or neck is mounted upon a neck on the side of the cylinder A, which neck is shown at $a^3$ of Fig. 1. Most of these parts, except the valve-chest, are shown in the previous application already referred to. The shaft $d$ is perforated axially, as shown at $d^4$, and this axial perforation is longer than the width of the cylinder A, and when it has passed the whole length of the cylinder it turns out through the side of the shaft $d$ and communicates, through holes in the sleeve $d^2\ d'$, with a cavity, $d^5$, in the top of the neck $a^4$, which is projected from the cylinder A toward the fly-wheel B and forms part of its center of revolution.

A pipe, $d^6$, crosses the cavity of the neck $a^3$ and communicates with a channel, $d^7$, perforated in said neck, which communicates with another pipe, $d^3$, leading into the interior of the fly-wheel B, through which oil is delivered from the interior of the fly-wheel. Packings (marked in black heavy lines) are shown in Fig. 1 around the shafts $d\ d^2\ d'$, and are marked $i$, and the side packings between the disk parts of the pistons C C' C² are marked $j$. These side packings are pressed up against the crowning-surface of the disk parts of said pistons by springs, as shown in Fig. 1. The web of the fly-wheel B is double, and is formed of a hexagonal plate on each side, as shown in Fig. 2 at B', which plate is attached to flanges B², (shown in Fig. 1,) which are chords cutting off small segments of the interior of the fly-wheel at equal distances around the rim. The web of the fly-wheel is a double hexagonal plate, three sides of which are in contact with the rim, and the other three sides, each of about two and one-half times the length of each of the three which are in contact with the rim of the fly-wheel, are chords which inclose small cylindrical segments between the upper surface of these chord-flanges and the inner surface of the rim of the fly-wheel. Within this hexagonal box the crank-connections are located, and the box is substantially oil-tight, and is intended to be run about half-full of oil.

The expansion-valve gear of this engine is somewhat peculiar. The valve-ports are as shown in Fig. 5. Steam enters through the passage $a$ and goes on toward the engine until it reaches the valve chest H. This valve-chest is, as shown in Fig. 1, of substantially the width of the cylinder A. The valve $h$, which is of cylindrical shape, hollow, and provided on the inside with ribs, revolves within the valve-chest. Two openings, $h'$, in the rim of this valve $h$ permit steam entering at its ends to pass through it, and there is interposed between the valve and the cylinder the shield H', which constitutes a portion of the valve-chest, through which shield are arranged the ports $h^3$, leading to the cylinder.

Steam, it will be seen from consulting Figs. 1 and 3, enters the valve at its ends from the steamway $a$, and is delivered through its sides into the cavity of the cylinder. The shield H' referred to is ribbed, as shown in Fig. 1, and is, in fact, a grid. This valve $h$ is mounted on a spindle, $h^4$, which passes through a stuffing-box, $h^5$, as shown in Fig. 1. Upon the end of the spindle is mounted a cog-wheel, L, which gears with another cog-wheel, L', mounted concentrically around the axis of the fly-wheel B. This cog-wheel L' moves with the fly-wheel B in its revolution, but is movable for short distances either way upon it under the influence of the links, which are actuated by the spring and lever-governor, hereinafter described. At three different points on this cog-wheel L' are attached links $l$, which are attached by other links, $l'$, to gears $l^2$, attached to arms which come down from the interior of the rim of the fly-wheel B. Between the posts which carry these cog-wheels and another set of posts, $l^3$, also projecting downward from the rim of the fly-wheel, there are mounted springs $l^4$, and a rack on the end of the spring-spindle serves to connect the spindle of the spring to the cog-wheel $l^2$.

In lieu of a rack a hook-pawl may be used, but not to as good advantage as the rack.

The spindle of the spring $l^4$ passes through the spring, and by means of a collar, $l^5$, a considerable degree of initial tension may be given to the spring by screwing up on the spindle the nut shown outside of the collar. The spindle of the spring is attached to the short arm of a bent lever, $l^6$, which is hinged to the long side of the hexagonal box which forms the web of the fly-wheel B.

As the fly-wheel B is revolved, the weight on the end of the lever $l^6$ would be thrown outward by centrifugal force unless it were prevented from moving by the tension of the spring $l^4$. That tension, being suitably adjusted for a given rate of speed, the weight will not be thrown out nor the lever $l^6$ be moved until a predetermined rate of revolution is exceeded, in which case the tension of the spring will be overcome, the spring will be shortened, and the spindle moved inward in such a way as to move slightly the cog-wheel $l^2$. In moving this cog-wheel $l^2$ the lever $l'$ will be disturbed, and the toggle-joint formed by the linkage $l\,l'$ will be straightened; but this straightening cannot take place without moving the cog-wheel L' in a direction opposite the direction of revolution of the fly-wheel B, (shown by the arrow in Fig. 2;) and this motion will move the cog-wheel L in an opposite direction and cause the valve $h$ to rotate with it, and thereby cut off the steam sooner than it otherwise would. If the engine is moving in a reverse direction, the same cutting off will occur. The exhaust, as will be noticed from Fig. 2, will in this pattern of engine always be free during about one-third of the revolution, and steam will be taken during about one-sixth of a revolution, and expansion will take place during about one-half of a revolution, the pistons being the induction-valves to each other, as described in the former application referred to, while the valve $h$ is a cut-off valve mainly.

The method of mounting the fly-wheel B upon the neck $a^3$ of the cylinder A is shown in Fig. 3. The neck is formed as a cylinder, which has upon one side of it a boss, (marked $a^4$,) and this boss is large enough to contain the shaft and sleeves attached to the pistons C C' C$^2$. The neck $a^3$ is completely encircled with a packing, (shown in black lines in Fig. 3,) and in a recess in the boss $a^4$ is another packing, against which the sleeve $d'$ runs.

The web B' of the fly-wheel is provided, as shown in Fig. 1, with a hub, B$^3$, which fits upon the neck $a^3$, as shown in Fig. 1 in vertical longitudinal section and in Fig. 3 in vertical transverse section.

A summary of the governor system above described may be thus stated: A continuously-revolved cylinder-valve is driven by a gear continuously revolved with and by the fly-wheel B; but its revolution may be hastened or retarded by moving the fly-wheel gear L' forward or back around the axis of revolution of the fly-wheel. This control movement is effected by a system of linkage, which connects the fly-wheel gear L' with the governor-balls situated near the periphery of the fly-wheel and revolved with it and movable by centrifugal force in and out on nearly radial lines. To secure the return of these balls, they move out against springs and are returned by the springs.

It is obvious that the precise form of linkage is unimportant and that the mounting of the balls on an elbow-lever is merely a matter of detail, the motion of the balls being the thing to be gathered and transmitted and the novelty being mainly that the governor is incorporated in the fly-wheel.

Having thus fully described our invention, we claim and desire to secure by Letters Patent of the United States—

1. A rotary steam-engine, in which are combined a steam-cylinder, three differentially-moving pistons mounted upon concentric axes, a fly-wheel mounted upon a center of revolution different from the center of revolution of the three steam-pistons, and a series of cranks, $d\,d'\,d^2$, of equal lengths and each longer than the distance separating the two centers of revolution, and connecting-rods $g\ g'\ g^2$, attached to said concentric shafts and to the interior of said fly-wheel, and a train of gearing, L L', revolving with and revolved by the revolution of the fly-wheel B, and a spring and weight-governor and linkage connecting the same with the gear L', which governor is attached to and revolves with the fly-wheel B, and a cut-off valve, $h$, substantially as described.

2. The fly-wheel B, consisting of a hollow hexagonal box, as described, within the rim of the said fly-wheel, which hexagonal box is adapted to contain the cranks and connecting-rods of the engine, substantially as described.

3. The fly-wheel formed, as described, with an oil-tight hollow web for containing the working parts and with a series of oil-channels, $d^4\ d^5\ d^6\ d^7\ d^8$, leading from the interior of said hollow web to and along the axes of revolution of the pistons C C' C² and to the bearings of these axes, substantially as described.

4. The cylinder A, provided with the neck $a^3$, containing the internal hollow boss, $a^4$, in combination with the fly-wheel B, provided with the web B' and its hub, substantially as and for the purposes described.

5. The combination of the continuously-revolved cylinder-valve $h$, with its gear-wheel L, the driving-gear L', mounted around the center of revolution of the fly-wheel B and revolved with said fly-wheel, the fly-wheel B, the governor mounted within said fly-wheel B and consisting of a weighted arm, $l^6$, actuated by the centrifugal force imparted to the weight by the revolution of the fly-wheel B, and a spring, $l^4$, which resists the outward throw of said weighted arm, a linkage between said governor and said gear L', whereby the outward or inward movement of the revolved weight is transmitted to said gear L' and moves it forward or back around its axis of revolution, substantially as described.

FRED R. LOW.
FRANK M. CLARK.

Witnesses:
J. M. DOLAN,
FRED. B. DOLAN.